(12) United States Patent
Kostin (10) Patent No.: US 11,807,138 B2
(45) Date of Patent: Nov. 7, 2023

(54) SEAT RAIL MODULE FOR A VEHICLE SEAT FOR VEHICLE SEAT DECELERATION IN THE EVENT OF A CRASH

(71) Applicant: Brose Fahrzeugteile SE & Co. Kommanditgesellschaft, Coburg, Coburg (DE)

(72) Inventor: Sergej Kostin, Coburg (DE)

(73) Assignee: Brose Fahrzeugtelle SE & Co. Kommanditgesellschaft, Coburg, Coburg (DE)

( * ) Notice: Subject to any disclaimer, the term of this patent is extended or adjusted under 35 U.S.C. 154(b) by 537 days.

(21) Appl. No.: 17/264,342

(22) PCT Filed: Jul. 29, 2019

(86) PCT No.: PCT/EP2019/070334
§ 371 (c)(1),
(2) Date: Jan. 29, 2021

(87) PCT Pub. No.: WO2020/025529
PCT Pub. Date: Feb. 6, 2020

(65) Prior Publication Data
US 2021/0291699 A1    Sep. 23, 2021

(30) Foreign Application Priority Data
Jul. 30, 2018    (DE) .................... 10 2018 118 398.4

(51) Int. Cl.
*B60N 2/02* (2006.01)
*B60N 2/07* (2006.01)
(Continued)

(52) U.S. Cl.
CPC ....... *B60N 2/02246* (2023.08); *B60N 2/0705* (2013.01); *B60N 2/4214* (2013.01);
(Continued)

(58) Field of Classification Search
CPC .............. B60N 2/02246; B60N 2/0705; B60N 2/4214; B60N 2/42709; B60N 2/4279; B60N 2/42781; B60N 2/02
(Continued)

(56) References Cited

U.S. PATENT DOCUMENTS 3,802,737 A    4/1974  Mertens
3,917,020 A    11/1975 Saab
(Continued)

FOREIGN PATENT DOCUMENTS

DE    2216378 A1    10/1973
DE    19613506 A1   10/1997
(Continued)

OTHER PUBLICATIONS

PCT/EP2019/070334; PCT International Search Report and Written Opinion of the International Searching Authority dated Oct. 15, 2019 and its English translation.
(Continued)

*Primary Examiner* — Amy R Weisberg
*Assistant Examiner* — Dana D Ivey
(74) *Attorney, Agent, or Firm* — Renner, Otto, Boisselle & Sklar, LLP (57) ABSTRACT

A seat rail module with two rails for longitudinal adjustment of a vehicle seat comprises a drive member, at least one deformation member coupled to an associated rail for longitudinal adjustment, at least one fastening member for fastening the drive member, and an actuator for locking and unlocking the at least one fastening member. The deformation member is deformed upon displacement of the vehicle seat in a main direction of travel to dissipate crash energy and decelerate the vehicle seat. In a locked position of the fastening member, the drive member is directly secured to a rail by the fastening member. The fastening member is
(Continued)

mechanically unlocked upon displacement of the vehicle seat beyond a predetermined limit setting, so that the drive member is coupled to an associated rail via the deformation member, to enable a displacement of an upper rail relative to a lower rail for dissipating impact energy.

22 Claims, 7 Drawing Sheets

(51) Int. Cl.
    *B60N 2/42* (2006.01)
    *B60N 2/427* (2006.01)

(52) U.S. Cl.
    CPC ....... *B60N 2/4279* (2013.01); *B60N 2/42709* (2013.01); *B60N 2/02* (2013.01); *B60N 2/42781* (2013.01)

(58) Field of Classification Search
    USPC ................................ 296/65.13, 65.15, 65.12
    See application file for complete search history.

(56) References Cited

U.S. PATENT DOCUMENTS

| | | | |
|---|---|---|---|
| 5,349,878 A | 9/1994 | White et al. | |
| 6,227,597 B1 | 5/2001 | Swann et al. | |
| 6,325,457 B1 | 12/2001 | Matsumoto et al. | |
| 6,435,591 B1 | 8/2002 | Nilsson | |
| 9,758,061 B2 * | 9/2017 | Pluta | B60N 2/0727 |
| 2005/0082890 A1 | 4/2005 | Taubmann et al. | |
| 2010/0065708 A1 | 3/2010 | Koga | |
| 2014/0239690 A1 | 8/2014 | Yamada et al. | |
| 2017/0259713 A1 | 9/2017 | Kostin | |
| 2017/0334319 A1 | 11/2017 | Sprenger | |
| 2020/0307425 A1 * | 10/2020 | Höpfner | B60N 2/4221 |

FOREIGN PATENT DOCUMENTS

| | | |
|---|---|---|
| DE | 19904224 C1 | 9/2000 |
| DE | 202007006908 U1 | 10/2008 |
| DE | 102012218722 A1 | 4/2014 |
| DE | 102013102224 A1 | 9/2014 |
| WO | 2006068567 A1 | 6/2006 |

OTHER PUBLICATIONS

First Office Action for corresponding Chinese Application No. 201980050869.8 dated Jun. 29, 2022.

* cited by examiner

SEAT RAIL MODULE FOR A VEHICLE SEAT FOR VEHICLE SEAT DECELERATION IN THE EVENT OF A CRASH

The present application is a U.S. National Stage Application based on and claiming benefit and priority under 35 U.S.C. § 371 of International Application No. PCT/EP2019/070334, filed 29 Jul. 2019, which in turn claims benefit of and priority to German Application No. 10 2018 118 398.4, entitled 'SEAT RAIL MODULE FOR A VEHICLE SEAT FOR VEHICLE SEAT DECELERATION IN THE EVENT OF A CRASH', filed 30 Jul. 2018, the entirety of both of which are hereby incorporated herein by reference.

FIELD OF INVENTION

The present invention relates in general to a seat rail module for a vehicle seat, in particular for a motor vehicle seat, and relates in particular to a seat rail module with provisions for a deceleration of the vehicle seat in the event of a crash, in particular for a deceleration of the vehicle seat in areas outside the effective range of conventional front occupant protection systems, in particular of front airbags.

PRIOR ART

Vehicle design must give sufficient consideration to occupant safety measures. In the case of vehicle seats located in the front area of vehicles, this is primarily done by front occupant protection systems, such as belt systems, belt tensioners and front airbags, which are designed to restrain occupants at a relatively late stage of a crash and which provide additional protection, particularly for the head and neck area.

Additional protective measures are so-called seat-based restraint means, which are coupled with a seat rail module and, in the event of a crash, yield to a crash impulse in a controlled manner while absorbing energy.

Various vehicle seat deceleration units are known in the prior art for this purpose. DE 102012218722 A1 discloses such a vehicle seat deceleration unit comprising deformation units which are attached or can be attached to a front and/or rear end of a vehicle seat and which cooperate with deformation members which are tubular and tapered at their ends in order to selectively dissipate impact energy in the event of a crash. A sensor system and an electronic control unit are associated with the vehicle seat deceleration unit. The sensor system includes sensors, for example inertial sensors, which collect information at a very early phase of a crash that provides indications of the severity of the crash. Sensor signals from predictive sensors, such as radar sensors or ultrasonic sensors, can also be evaluated as a supplement. The stiffness of the vehicle seat deceleration unit is then adjusted based on the degree of the severity of the crash that has been determined. Rings that enclose the tapered ends of the tubular deformation members and that can be displaced in axial direction are used for this purpose. Actuation of the vehicle seat deceleration unit thus requires suitable electronics and controls, which necessitates additional provisions in the event of failure of the electronics or controls or the vehicle electrics.

DE 196 13 506 A1 discloses a pair of seat rails for vehicle seats that can be displaced in longitudinal direction, comprising at least one energy absorption member in the path in which the force acting on the seat is transmitted into the vehicle structure, which allows a longitudinal displacement of the seat under plastic deformation when a predetermined value of the force is exceeded. The energy absorption member is provided on a carriage connected to the lower rail to be connected to the vehicle structure, by means of which the upper rail to be connected to the seat can be locked in different longitudinal settings and by means of which, after disconnection from the lower rail, the upper rail can be displaced on the lower rail under energy absorption.

Another setup of the aforementioned type is disclosed in WO 2006 068567 A1, wherein the seat mounting means comprise a first member which can be fixedly mounted to the seat and a second member which can be fixedly mounted to the floor of the vehicle, wherein the first member is connected to the second member in such a manner that the first member can be displaced rearwardly with respect to the second member in a substantially horizontal plane. In this regard, the seat mounting means further comprise a force limiting means which, in a first condition, prevents a relative displacement between the first member and the second member, and, in a second condition corresponding to a collision, is arranged such that, when a predetermined force is applied rearwardly in the horizontal plane by a vehicle component to the first member via the seat occupant, a displacement of the first member relative to the second member is caused, thereby reducing the risk of injury to the seat occupant by the vehicle component.

U.S. Pat. No. 6,435,591 B1 discloses a device for preventing whiplash, comprising means enabling a controlled displacement of the entire seat against the direction of travel during rapid changes in speed, wherein the seat is provided with control means arranged to impart to the seat and its occupant a substantially simultaneous and substantially linear movement against the direction of travel and/or a substantially arcuate movement, the seat being arranged to remain in a rearward position after the change in speed.

Another arrangement of the aforementioned type is disclosed in U.S. Pat. No. 6,227,597 B1.

The aforementioned arrangements are designed to act within an effective range of front occupant protection systems.

However, in connection with new interior concepts for motor vehicles and, in particular, 'autonomous driving', new types of seating positions for the driver or front passenger will arise in the future which, compared with the known 'conventional seating positions', may lie partially outside the effective range of front occupant protection systems, in particular outside the effective range of front airbags. Furthermore, in vehicles reclining positions can also be adopted as seating positions, for example by front passengers while driving, which seating positions are not upright and thus also lie significantly 'behind' those driver seat positions in which front occupant protection systems, in particular front airbags, are effective.

The aforementioned novel seat and occupant positions by drivers and front passengers generally can be adjusted only when the rear row of vehicle seats is unoccupied or is even reclined to a 'stowed' position, which allows the driver or front passenger seats to be displaced very far backward and beyond the effective range of front occupant protection systems. This in turn results in an additional distance and movement space in the event of a front crash or rear crash, resulting in a deterioration of the effectiveness of occupant restraint systems, which is not desirable.

US2020 0307425 A1 'SEAT RAIL MODULE FOR A VEHICLE SEAT FOR VEHICLE SEAT DECELERATION IN THE EVENT OF A CRASH' of the Applicant, which is a national phase application based on PCT/EP 2018/070674 filed on Aug. 2, 2018, discloses a generic seat rail module in which the fastening members are mechanically unlocked upon a longitudinal displacement of the vehicle seat in a direction opposite to a main direction of travel beyond a predetermined limit line. For this purpose, the fastening members are resiliently biased against the rails for longitudinal adjustment, wherein in a normal state the fastening members are in engagement with correspondingly formed counter members on an underside of the rails for longitudinal adjustment and disengage from the counter members upon a longitudinal displacement of the vehicle seat in a direction opposite to the main direction of travel beyond the predetermined limit line.

SUMMARY OF INVENTION

Against this background, the present invention is to provide simple, reliable and effective measures for occupant safety, in particular for novel seating positions of a driver or front passenger arising in the future, for example in 'autonomous driving'. In particular, according to the present invention, there is to be provided an enhanced seat rail module for a vehicle seat that can be manufactured and installed in a vehicle at low cost and that enables reliable and effective measures for occupant safety over a very wide displacement range of the vehicle seat.

According to the present invention, there is provided a seat rail module for a vehicle seat, in particular for a motor vehicle seat, comprising two rails for longitudinal adjustment arranged parallel to one another for guidance and longitudinal adjustment of the vehicle seat, which rails for longitudinal adjustment each have a lower rail which can be fixed in a stationary manner to the floor of a vehicle body, and an upper rail which can be displaced longitudinally with respect thereto, comprising a drive member with a drive coupled thereto for longitudinal adjustment of the vehicle seat, at least one deformation member coupled to an associated rail for longitudinal adjustment, and at least one fastening member for fastening the drive member to the associated lower rail or upper rail, in particular by locking, wherein the vehicle seat can be fastened to the upper rails and wherein the deformation member is designed to be deformed upon displacement of the vehicle seat in a main direction of travel in order to dissipate energy in the event of a crash and to decelerate the vehicle seat.

According to the present invention, the seat rail module comprises an actuator for locking and unlocking the at least one fastening member, wherein, in a locked position of the fastening member, the drive member is directly secured to the associated lower rail or upper rail by the fastening member, and wherein the fastening member is mechanically unlocked when the vehicle seat is displaced beyond a predetermined limit setting so that the drive member is coupled to the associated lower rail or upper rail via the deformation member.

According to the present invention, after activation or actuation of the actuator, the flow of force between the force transmitted into the vehicle seat and the floor assembly can be interrupted by unlocking the at least one fastening member in order to separate the drive member used for longitudinal displacement, such as a spindle of a spindle drive for longitudinal adjustment, from the lower rail or upper rail and to enable a displacement of the upper rail relative to the lower rail over a certain distance predetermined by characteristics of the deformation member and its connection to the seat rail module. In the non-active mode, the drive member is secured by means of fastening members, such as locking bolts. This provides a direct flow of force to the lower rail. In the activated mode, for example when assuming a reclined or relaxed position and/or longitudinal displacement of the vehicle seat far to the rear (displacement of the vehicle seat beyond a predetermined limit setting within which occupant protection safety systems, such as front airbags or seat belts, are sufficiently effective), the fastening members are unlocked by activating or operating the actuator, for example by raising or pulling a locking bolt. In this state, the actuator is coupled to the associated lower rail or upper rail via a deformation member, so that the flow of force is introduced into the lower rail or upper rail indirectly, namely via the deformation member. By irreversible plastic deformation or by reversible elastic deformation of the deformation member in the event of very high acceleration forces suddenly occurring, in particular in the event of a front crash or rear crash, a displacement of the upper rail relative to the lower rail over a certain distance can be effected in this state with simultaneous deformation of the deformation member, whereby according to the present invention energy can be selectively dissipated and crash forces on the vehicle occupant can be reduced.

According to a further embodiment, the drive member is coupled to an associated upper rail or lower rail and secured to the associated lower rail or upper rail by means of mounting brackets. The mounting brackets, in particular a rear mounting bracket as viewed in the intended direction of travel, can serve as a location of engagement for positive engagement of the locking bolt. For this purpose, the mounting bracket is preferably designed as a right-angled mounting bracket or as a rectangular block of sufficient mechanical stability.

According to a further embodiment, a first mounting bracket of the mounting brackets, in particular a rear mounting bracket as viewed in the intended direction of travel, has a recess at a first end of the associated lower rail, wherein the fastening member is in engagement with the recess in the locked position. As a result, an advantageously high rigidity can be implemented in the locked state of the fastening member that can be adjusted in an advantageously simple manner by means of the characteristics and geometry of the mounting bracket.

According to a further embodiment, a second mounting bracket of the mounting brackets is rigidly attached to a second end of the associated lower rail, in particular a front mounting bracket, as viewed in the intended direction of travel, to the associated lower rail. In this way, an advantageously high rigidity can be implemented that can be adjusted in an advantageously simple manner by means of the characteristics and geometry of the mounting bracket.

According to a further embodiment, a securing member is additionally provided for securing the deformation member to the associated lower rail, the securing member being movable relative to the associated lower rail or upper rail in the longitudinal direction thereof over the aforementioned predetermined distance in the event of a crash in order to compensate for a change in length of the deformation member (compression or stretching of the deformation member). In this case, the securing member is designed to be sufficiently stable so that, in the event of a displacement of the upper rail relative to the lower rail beyond the aforementioned predetermined distance, the upper rail and the drive member are then coupled substantially rigidly to the lower rail or upper rail, for example by bearing against an edge of the mounting bracket or of a receptacle formed therein.

According to a further embodiment, an oblong hole is formed in a bottom of the associated lower rail or upper rail, with the securing member engaging through the oblong hole. The oblong hole serves to precisely guide the securing member during deformation of the deformation member and displacement of the upper rail relative to the lower rail. When the upper rail is displaced relative to the lower rail beyond the aforementioned predetermined distance, the securing member automatically comes into direct contact with an edge of the oblong hole. For this purpose, the securing member is expediently designed as a cylindrical securing bolt of sufficiently high stability, which is screwed into or firmly connected to the mounting bracket of the drive member and by means of which the deformation member is connected directly to the mounting bracket.

According to a further embodiment, the predetermined limit setting corresponds to a predetermined longitudinal position of the upper rails relative to the associated lower rails, wherein the fastening member is mechanically unlocked upon a longitudinal displacement of the vehicle seat in the direction opposite to the main direction of travel beyond the predetermined longitudinal position. Until the upper rails reach this longitudinal position, front occupant protection systems such as airbags or seat belt systems, for example, can be sufficiently effective. A longitudinal displacement of the vehicle seat beyond this predetermined longitudinal position indicates that the vehicle seat takes a relax position, such as it may be taken during autonomous driving. In this relax position of the vehicle seat, front occupant protection systems, such as airbags or seat belt systems, can no longer be sufficiently effective.

According to a further embodiment, push-down members are accommodated in the rails for longitudinal adjustment, said push-down members being coupled to the vehicle seat and actuating the actuator to unlock the fastening member upon a longitudinal displacement of the vehicle seat in the direction opposite to the main direction of travel beyond the predetermined longitudinal position. This can ensure an advantageously simple mechanical actuation of the actuator.

According to a further embodiment, the push-down members are entrained during a longitudinal displacement of the vehicle seat. For this purpose, the push-down members can, for example, be attached to or formed on the underside of the upper rails and project into the interior space formed by the upper rail and the lower rail of a respective rail for longitudinal adjustment. In this way, an advantageously compact geometry can be accomplished in a simple manner.

According to a further embodiment, the push-down members are formed as portions of devices for longitudinal adjustment that can be actuated electrically and are accommodated in the rails for longitudinal adjustment.

According to a further embodiment, front and/or rear edges of the push-down members, as viewed in the longitudinal direction of the rails for longitudinal adjustment, are beveled, whereby a smooth sliding of the actuator into an activated state for unlocking the fastening member when the predetermined limit setting is reached and a further displacement beyond this predetermined limit setting can be achieved.

According to a further embodiment, the predetermined longitudinal position of the upper rails relative to the associated lower rails, as viewed in the longitudinal direction of the rails for longitudinal adjustment, is predetermined by an area in a vehicle in which the vehicle seat is located outside an effective range of a front airbag.

According to a further embodiment, the predetermined limit setting corresponds to a predetermined setting of parameters of the vehicle seat, in particular a predetermined angle of inclination of a back rest of the vehicle seat, wherein the fastening member is mechanically unlocked upon a displacement of the vehicle seat beyond the predetermined setting of parameters of the vehicle seat.

According to a further embodiment, the actuator is designed as a lever that is pivotably mounted on the first mounting bracket, wherein the fastening member is designed as a locking bolt with a circumferential plate-like projection, and wherein the lever has a lever arm with a recess that engages behind the circumferential plate-like projection of the associated locking bolt in order to unlock the latter by raising when the lever is displaced. Thus, a purely mechanical unlocking of the fastening member that is triggered automatically can be implemented by means of a simple mechanical setup.

According to a further embodiment, the lever is accommodated in a receptacle formed in the first mounting bracket, whereby the geometry of a structure for locking and unlocking the fastening member can be made even more compact and advantageously mechanically stable, in particular rigid. This compact geometry is particularly suitable for an arrangement within the relatively small interior space formed between the upper rail and the lower rail of a rail for longitudinal adjustment.

According to a further embodiment, the actuator comprises an electric motor, a linear actuator or a pyrotechnically ignitable solid propellant coupled to the at least one fastening member.

This enables an electromechanical displacement of the fastening member for unlocking and/or locking. In particular, this also enables monitoring of safety-relevant setting parameters of the vehicle seat by means of electronic or optoelectronic sensors. Particularly an electromechanical displacement of the fastening member enables advantageously short response times to be implemented for unlocking and/or locking the fastening member when very high acceleration forces suddenly occur, in particular in the event of a front crash or rear crash. In particular, it is also possible to implement an unlocking and/or locking of the fastening member when a pre-crash signal is output by a central electronic control unit.

According to a further embodiment, additionally there is provided an electronic control unit, wherein the electronic control unit is configured to activate the actuator upon a displacement of the vehicle seat beyond the predetermined limit setting in order to automatically unlock the at least one fastening member.

According to a further embodiment, additionally there is provided at least one sensor to monitor settings of the vehicle seat, wherein the sensor is coupled to the electronic control unit and the electronic control unit is configured to evaluate output signals of the sensor and to output an activation signal for activating the actuator.

According to a further embodiment, the respective deformation member is formed as a reversibly elastically deformable member.

According to an alternative embodiment, the respective deformation member is formed as an irreversibly plastically deformable member.

According to a further embodiment, the irreversibly plastically deformable member is formed as a compression rod or tension rod which is coupled on the one hand to the bottom of the vehicle body or to the bottom of the lower rail and on the other hand to the drive member, in particular with a mounting bracket for supporting the drive member within the inner space of the rail for longitudinal adjustment, which is formed between the upper rail and the lower rail.

According to the present invention, the mechanical characteristics of the deformation member determine in an advantageously simple manner the rigidity of the mechanical coupling of the vehicle seat to the floor of the vehicle body. In the case of normal loads, such as during normal driving operation or upon a longitudinal displacement of the vehicle seat, the fastening members thereby secure the vehicle seat reliably. The fastening members are unlocked only upon a displacement of the vehicle seat beyond a predetermined limit setting (longitudinal position, angle of inclination of back rest, etc.). Only when an acceleration threshold value is exceeded in the event of a crash or the like is the deformation member finally deformed in the unlocked state of the fastening members, as a result of which impact energy can be dissipated to a very considerable extent in the event of a crash, even if at this point in a crash the vehicle seat is initially located in an area in which front occupant protection systems, in particular front airbags, are not yet sufficiently effective.

OVERVIEW ON DRAWINGS

In the following, the invention will be described in an exemplary manner and with reference to the accompanying drawings, from which further features, advantages and problems to be solved will result. In the drawings.

In the drawings, identical reference signs denote identical or substantially identical members or groups of members.

DETAILED DESCRIPTION OF PREFERRED EMBODIMENTS

Figure 1:
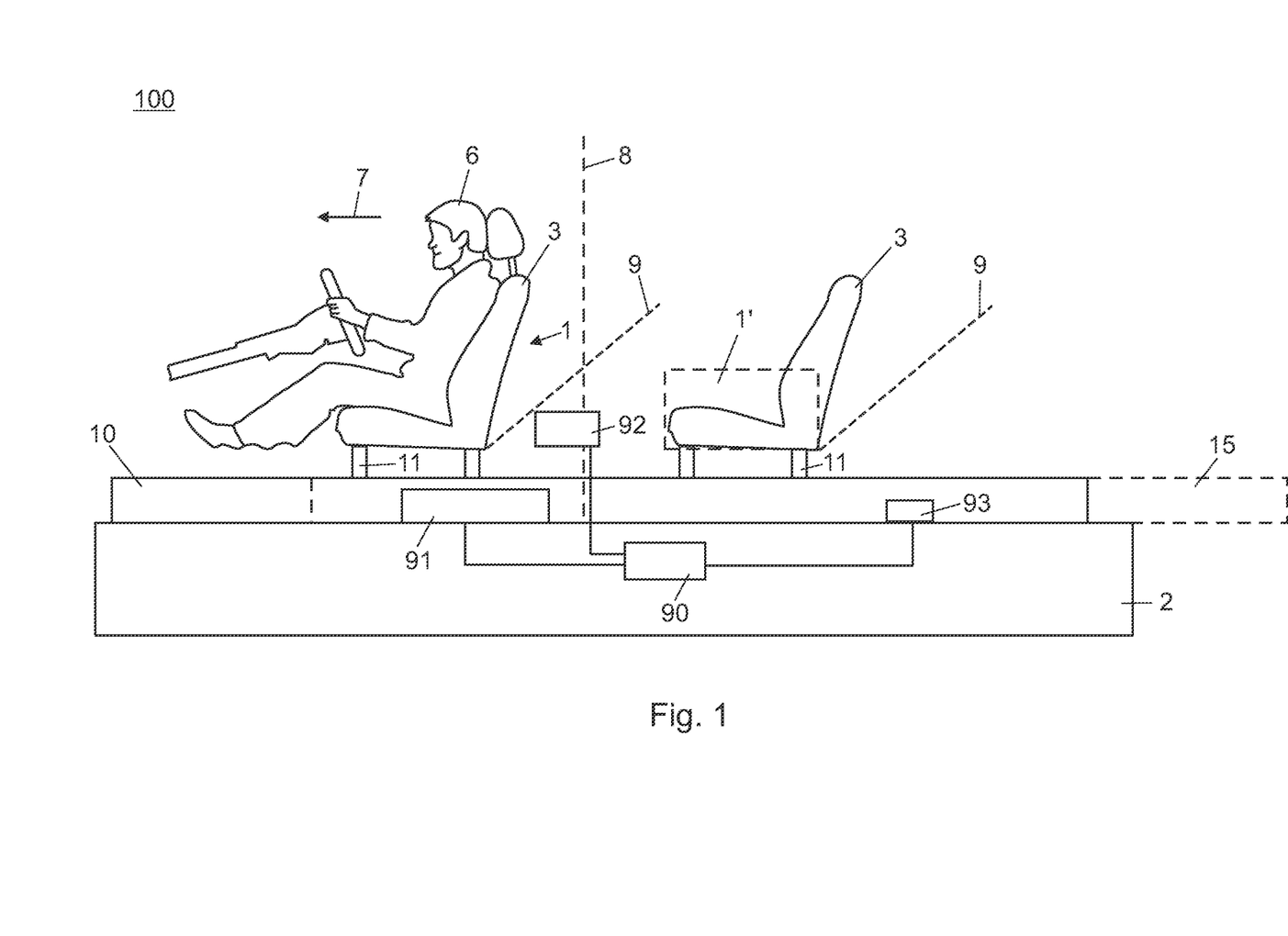
FIG. 1 is a schematic side view of a seat rail module according to the present invention and its arrangement in a passenger compartment of a motor vehicle.

FIG. 1 shows in a schematic side view the general structure of a seat rail module 100 according to the present invention and its arrangement in a passenger compartment of a motor vehicle. The floor 2 of the vehicle is shown here only schematically and this is suitably shaped according to the specifications of the vehicle manufacturer. In FIG. 1 and the other drawings, the direction of the main direction of travel is indicated by an arrow and by reference sign 7. According to FIG. 1, the seat rail module 100 comprises two rails 10 for longitudinal adjustment which run parallel to one another and are fastened to the floor 2 of the vehicle, the rails 10 for longitudinal adjustment each comprising a lower rail 20 (hereinafter also referred to as lower rail), which is connected to the floor 2 of the vehicle, and an upper rail 15 (hereinafter also referred to as upper rail) which is supported such that it can be displaced in longitudinal direction relative to the lower rail and to which the vehicle seat 1 is fastened by means of connecting levers 11. An adjustment drive 91 for longitudinal adjustment of the vehicle seat 1 is assigned to the rails 10 for longitudinal adjustment, as described in more detail below.

FIG. 1 is based on the fact that in the left-hand part of FIG. 1, i.e. at the front end of the seat rail module 100 as viewed in the direction of travel 7, front occupant protection systems, in particular front airbags, are effective to a sufficient degree, but that when the vehicle seat 1 is displaced rearwards beyond the limit line 8 (hereinafter also referred to as the predetermined longitudinal position of the vehicle seat), i.e. in the right-hand part of FIG. 1, the front occupant protection systems, in particular front airbags, are no longer sufficiently effective. For a displacement of the vehicle seat 1 into the rear area, it may be necessary in this case to fold down the rear vehicle seat 1 or to return it to a stowed position, as indicated by the dashed area and by reference sign 1', so as to extend the adjustment range of the front vehicle seat 1 toward the rear. This rear area may be due, for example, to new interior concepts of motor vehicles in connection with 'autonomous driving', in which the vehicle seat may be moved significantly rearward, or may also be due to the adoption of reclining positions as seating positions, in particular by a front passenger. In these positions, the vehicle seat 1 is not necessarily upright, so that it will then also be significantly 'behind' those driver seat positions in which front occupant protection systems, in particular front airbags, are effective.

Another possibility is that the back rest 7 is swiveled back relatively far into a relax position while the vehicle is in motion, until finally a limit line 9 for the inclination of the back rest (hereinafter also referred to as predetermined limit angle) is exceeded and a seat position is taken in which front occupant protection systems, in particular front airbags but also seat belt systems or the like, are no longer effective to a sufficient degree. Such a swinging back may also be desired, for example, by a front passenger in a front position of the vehicle seat 1. If the vehicle seat is swung back too far, there is a risk that the vehicle occupant 6 will slip under a lap belt of a seat belt system in a situation involving sudden, very high acceleration forces, in particular in the event of a front crash or rear crash.

In order to provide adequate occupant protection in such situations associated with such suddenly occurring very high acceleration forces, the seat rail module 100 further comprises an actuator 93 which, upon activation or actuation, interrupts the flow of force between the force introduced into the vehicle seat and the floor assembly to separate the drive member used for longitudinal adjustment, for example the spindle of a spindle drive for longitudinal adjustment of the vehicle seat 1, from the lower rail 20 to allow a displacement of the upper rail 15 relative to the lower rail 20. In the non-active mode, the drive member is secured by means of fastening members, for example locking bolts. This provides a direct flow of force to the lower rail 20. In the activated mode, for example when taking a reclined or relaxed position and/or a longitudinal adjustment of the vehicle seat 1 far toward the rear (displacement of the vehicle seat 1 beyond a predetermined limit setting 8, 9), the fastening members are unlocked by activating or actuating the actuator 93, for example by raising or pulling a locking bolt. In this state, the drive member is coupled to the associated lower rail via a deformation member, so that the flow of force is directed into the lower rail 20 via the deformation member. By irreversible plastic or reversible elastic deformation of the deformation member in the event of suddenly occurring very high acceleration forces, in particular in the event of a front crash or rear crash, a displacement of the upper rail 15 relative to the lower rail 20 can be effected in this state with simultaneous deformation of the deformation member, whereby according to the present invention energy can be selectively dissipated and crash forces on the vehicle occupant 6 can be reduced. The distance over which such a displacement of the upper rail 15 relative to the lower rail 20 is possible with simultaneous deformation of the deformation member is thereby determined by the characteristics of the deformation member, its mounting geometry and additional characteristics of the seat rail module 100, as described in more detail below.

According to the present invention, the actuator 93 can thereby be activated or actuated purely mechanically and automatically when the vehicle seat 1 is displaced beyond a predetermined limit setting 8, 9. In this case, the exceeding of the predetermined limit setting 8, 9 of the vehicle seat can be sensed purely mechanically. For example, when a limit setting 8, 9 is reached and exceeded, a driving member may actuate a mechanism that ultimately results in activation or actuation of the actuator 93.

In principle, a central control unit 90 may also be associated with the seat rail module 100 for activating or actuating the actuator 93, as shown in FIG. 1. Furthermore, a sensor 92 may be associated with the vehicle seat 1 to detect, for example, an angle of inclination of the back rest 3 and/or a longitudinal position of the vehicle seat 1 along the rails 10 for longitudinal adjustment and to output a corresponding output signal to the central control unit 90. When a predetermined threshold value is exceeded, indicating a displacement of the vehicle seat 1 beyond a predetermined limit setting 8, 9, the central control unit 90 may then output an activation signal to the actuator 93 to activate or actuate the actuator 93.

Figure 2A:
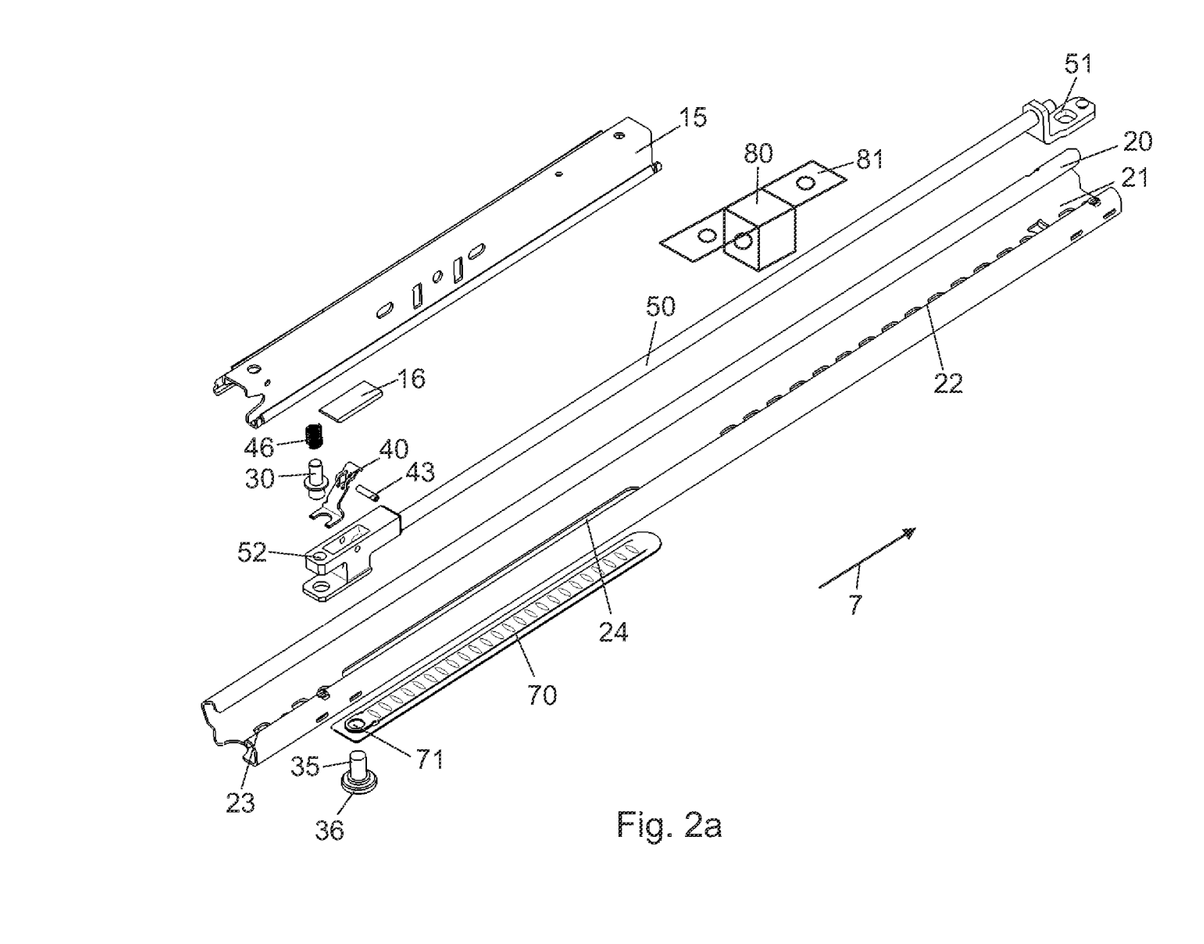
FIG. 2a shows a first embodiment of a seat rail module according to the present invention in a perspective exploded view.

FIG. 2a shows more details of a seat rail module according to the present invention in a perspective exploded view. The lower rail 20 is fixedly connected to the floor of a vehicle body. A plurality of recesses or apertures 22, 23 spaced apart from one another are provided in the bottom 21 of the lower rail 20, in which locking pins engage positively for fixing a longitudinal position of the upper rail 15 and the vehicle seat. Furthermore, an oblong hole 24 is formed in the bottom 21 of the lower rail 20, through which a crash bolt 35 engages, which secures a deformation member 70, designed as a compression bar, to the lower rail 20.

Furthermore, a drive member with an associated force transmission member for longitudinal adjustment of the upper rail 15 relative to the lower rail 20 is accommodated and mounted in the interior of a rail for longitudinal adjustment formed between the lower rail 20 and the upper rail 15, which is mounted thereon so as to be displaceable in the longitudinal direction. In the embodiment shown, a conventional spindle drive with a spindle 50 is provided as the drive member, as disclosed, for example, in DE 198 61 278 B4 of the Applicant, the contents of which are hereby expressly included by way of reference. In principle, of course, other adjusting devices can also be used as the drive member, for example worm drives with a fixed toothed rack, or also hydraulic or pneumatic adjusting drives.

According to FIG. 2a, the spindle 50 is secured to the bottom 21 of the lower rail 20 by means of a front spindle mounting bracket 51 and a rear spindle mounting bracket 52. To secure the spindle mounting brackets 51, 52 and the spindle 50 to the lower rail 20, in a locked state, locking pins 30 engage through holes on the spindle mounting brackets 51, 52 to engage recesses 22, 23 in the bottom 21 of the lower rail 20. The front spindle mounting bracket 51 may also be fixedly bolted to the bottom 21 of the lower rail 20.

The spindle 50 cooperates in a known manner with a gear 80 which is accommodated in a U-shaped mounting bracket 81 which is fixedly connected to the upper rail 15. In a conventional setup, an electric adjustment drive is disposed between the two rails for longitudinal adjustment of a seat rail module 100, which are arranged parallel to each other, in order to drive drive shafts, the driving force of which is transmitted via the gear 80 into a rotary movement of a spindle nut or a worm gear to effect a longitudinal displacement of the upper rail 15 together with the vehicle seat (not shown) relative to the lower rail 20.

Referring to FIG. 2a, the rear spindle mounting bracket 52, as viewed in the direction of travel 7, is secured to the lower rail 20 by means of a locking bolt 30 acting as a fastening member which, in a locked position, engages one of the recesses 23 in the bottom 21 of the lower rail 20. Associated with the locking bolt 30 as an actuator is an actuating lever 40, which can raise the locking bolt 30 for unlocking.

In the unlocked state of the locking bolt 30, the spindle 50 (drive member) continues to be firmly connected to the bottom 21 of the lower rail 20 at the front end, as viewed in the direction of travel 7, via the spindle mounting bracket 51, while the rear spindle mounting bracket 52, as viewed in the direction of travel 7, is indirectly connected to the bottom 21 of the lower rail 20, namely via the deformation member 70, which is fastened to the rear spindle mounting bracket 52 by means of the crash bolt 35. The other end of the deformation member 70 is fastened to the bottom 21 of the lower rail 20 or in a longitudinal recess in the floor of the vehicle body by means of another fastening member (not shown).

In the event of a situation involving suddenly occurring very high acceleration forces, in particular in the event of a front crash or rear crash, in the unlocked state the deformation member 70 is finally deformed reversibly elastically or irreversibly plastically, resulting in compression (or also stretching) of the deformation member 70 and thereby enabling a displacement of the spindle 50 (of the drive member) and the upper rail 15 connected thereto relative to the lower rail 20. At the same time, the crash bolt 35 remains laterally guided in the oblong hole 24 in the bottom 21 of the lower rail 20. The distance of this displacement of the spindle 50 (drive member) and of the upper rail 15 connected to it relative to the lower rail 20 is limited by the length of the oblong hole 24. If the crash bolt 35 finally comes into contact with the rear end of the oblong hole 24, as viewed in the direction of travel, the spindle 50 (the drive member) and the upper rail 15 connected to it are again rigidly connected to the lower rail 20. However, energy can be dissipated by deformation of the deformation member 70, thus providing improved occupant protection.

Figure 2B:
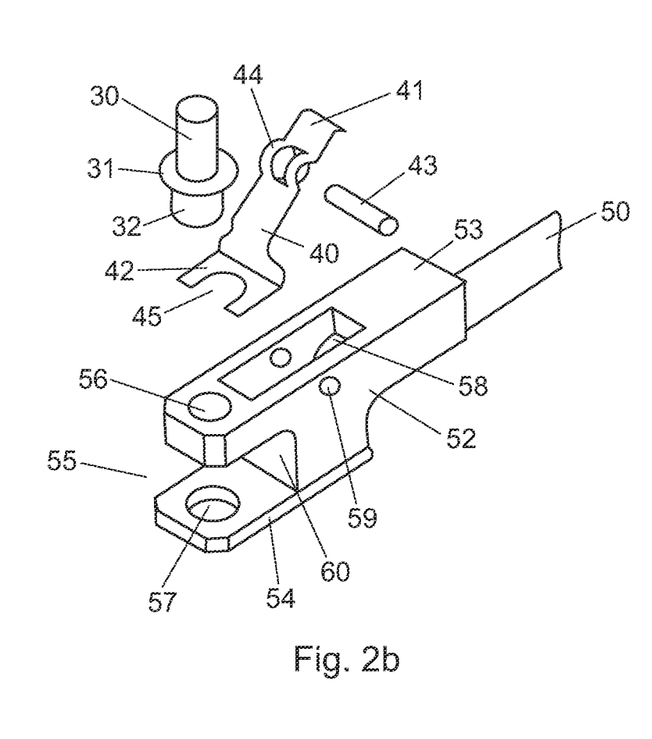
FIG. 2b shows details of the seat rail module of FIG. 2a in a highly magnified view.

As shown in FIG. 2b in a highly magnified view, the actuating lever 40 acting as an actuator is pivotally mounted in a receptacle or cavity 58 of the rear spindle mounting bracket 52, the pivot axis 43 passing through a bearing 44 on the actuating lever 40 and being mounted in holes 59 in the spindle mounting bracket 52. For mechanical actuation of the actuating lever 40, the first lever end 41 cooperates with a control cam or driver 16 which, as shown in FIG. 2a, is mounted on the underside of the upper rail 15 and is entrained together with it upon a displacement of the upper rail in longitudinal direction, to finally push down the first lever end 41. This causes the second lever end 42, in which a recess 45 is formed, to be raised, projecting out of a recess 60 and into a clearance 55 at the rear end of the rear spindle mounting bracket 52. The second lever end 42 engages with the recess 45 behind a plate-like circumferential projection 31 of the locking bolt 30. When the actuating lever 40 is pivoted about the axis of rotation 43, the locking bolt 30 is finally raised to a sufficient degree and its engagement in the recesses 23 in the bottom 21 of the lower rail 20 is released (cf. FIG. 2a). The locking bolt 30 and the actuating lever 40 are thereby elastically biased into a locked position by means of a compression spring 46 (cf. FIG. 2a or 3).

Figure 3:
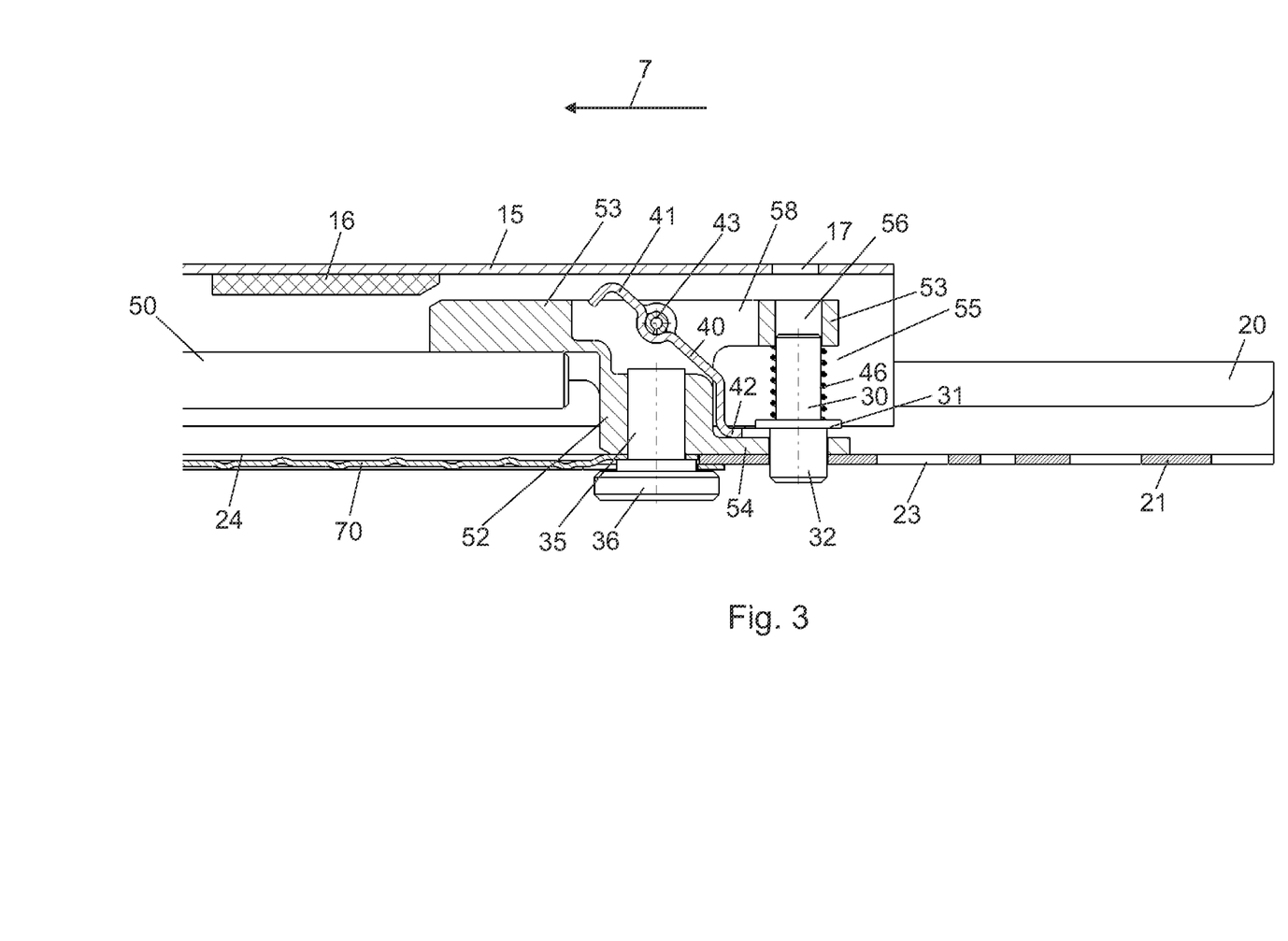
FIG. 3 shows the state of the seat rail module of FIG. 2a in a locked state of the fastening members.
Figure 4A:
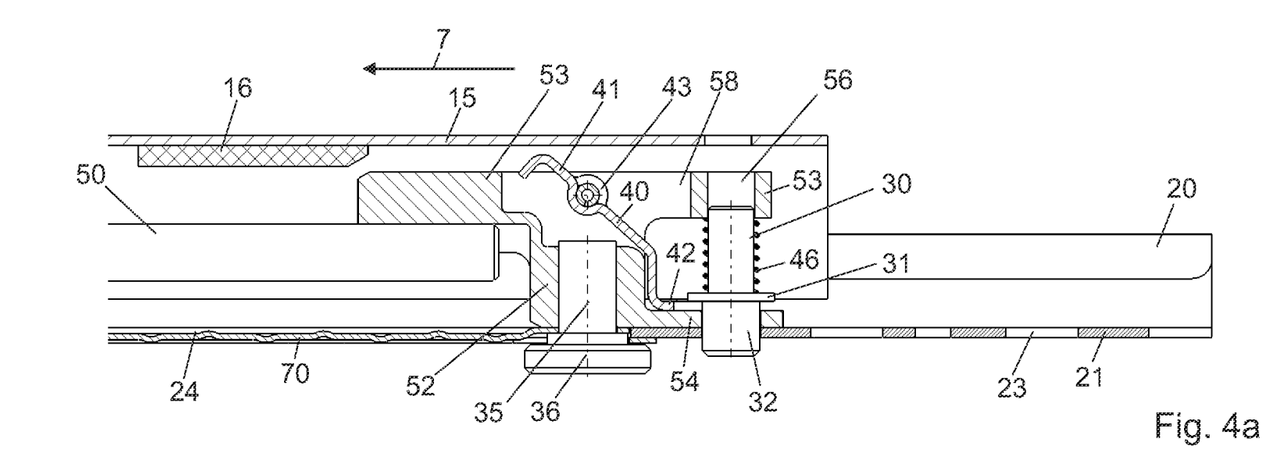
FIGS. 4a and 4b show in comparative views the state of the seat rail module in a locked state of the fastening members of FIG. 3 and in a state after mechanical unlocking of the fastening members by displacement of the vehicle seat rearward in a direction opposite to a main direction of travel beyond a predetermined longitudinal position of the vehicle seat and with incipient plastic deformation of a deformation member, for example in a crash, in particular after a frontal crash.

FIGS. 3 and 4a, respectively, show details of the seat rail module according to FIG. 2a in a locked state of the crash bolt 35. As shown in FIG. 3, a front end of the rear spindle mounting bracket 52, as viewed in the direction of travel 7, is beveled, and furthermore a rear end of the control cam or push-down member 16, as viewed in the direction of travel 7, is beveled correspondingly. Furthermore, a bent portion of the first lever end 41 of the actuating lever 40 extends substantially parallel to the slope at the front end of the control cam or push-down member 16.

When the upper rail 15 is displaced rearward against the intended direction of travel 7, the rear end of the control cam 16 finally comes into contact with the bent front end of the first lever end 41 of the actuating lever. This position defines a predetermined longitudinal position of the vehicle seat, up to which the locking bolt 30 engages in the recess 23 in the bottom 21 of the lower rail 20 and couples the spindle 50 (drive member) and the upper rail 15 connected to it rigidly to the lower rail 20.

Figure 4B:
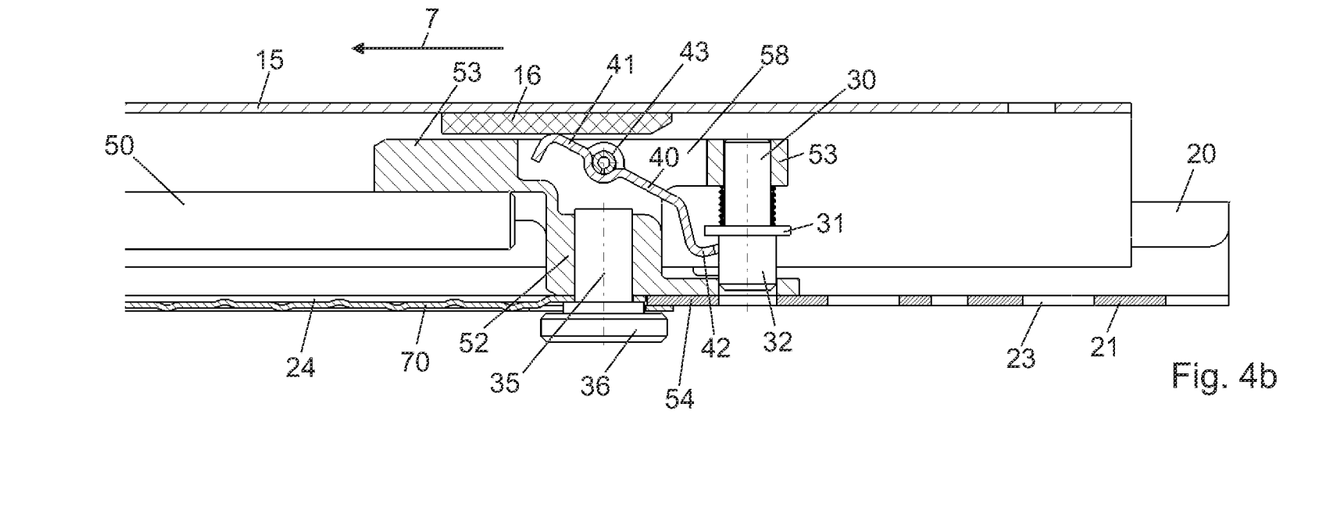

When the upper rail 15 is displaced further beyond this predetermined longitudinal position and further against the intended direction of travel 7, the first lever end 41 is finally pushed down by contact with the control cam or push-down member 16, as shown in FIG. 4b, which causes a corresponding pivoting of the second lever end 42 about the axis of rotation 43 and a raising of the locking bolt 30. Finally, the engagement of the locking bolt 30 in the recess 23 in the bottom 21 of the lower rail 20 is released.

In the unlocked state according to FIG. 4b, the flow of force between the force introduced into the vehicle seat and the floor assembly is interrupted and the drive member used for longitudinal adjustment, namely in the embodiment described the spindle 50 of a spindle drive for longitudinal adjustment, is no longer rigidly and directly connected to the lower rail 20, but is only indirectly coupled to the lower rail 20 via the deformation member 70 at the rear end, as viewed in the direction of travel 7. A deformation of the deformation member 70 allows a certain displacement of the upper rail 15 relative to the lower rail 20. In this state, the flow of force is directed into the lower rail 20 via the deformation member 70. By irreversible plastic or reversible elastic deformation of the deformation member 70 in the event of suddenly occurring very high acceleration forces, in particular in the event of a front crash or rear crash, a displacement of the upper rail 15 relative to the lower rail 20 can be effected in this state with simultaneous deformation of the deformation member 70, whereby according to the present invention energy can be selectively dissipated and crash forces on the vehicle occupant 6 can be reduced.

The monitoring of the longitudinal position of the upper rail or of the vehicle seat described above serves here only as an example of safety-relevant setting parameters of the vehicle seat while driving. Additional safety-relevant setting parameters of the vehicle seat can be any of the following: an angle of inclination of the back rest 3 of the vehicle seat 1 (cf. FIG. 1), an angle of inclination of a seat surface of the vehicle seat 1; a height level of a seat surface of the vehicle seat 1 (for example, lowering the seat surface too far, for example in a relax position of the vehicle seat, might result in the risk of the vehicle occupant slipping through a lap belt (so-called 'submarining')).

In the sense of the present invention, these setting parameters can be mechanically sensed to mechanically actuate the actuator for unlocking the locking bolt. In principle, however, these setting parameters can also be monitored by means of sensors 82 (cf. FIG. 1), so that a central control unit 90 outputs an activation signal when a predetermined limit setting is exceeded in order to electrically activate or actuate an actuator 93, for unlocking the locking bolt.

Figure 5A:
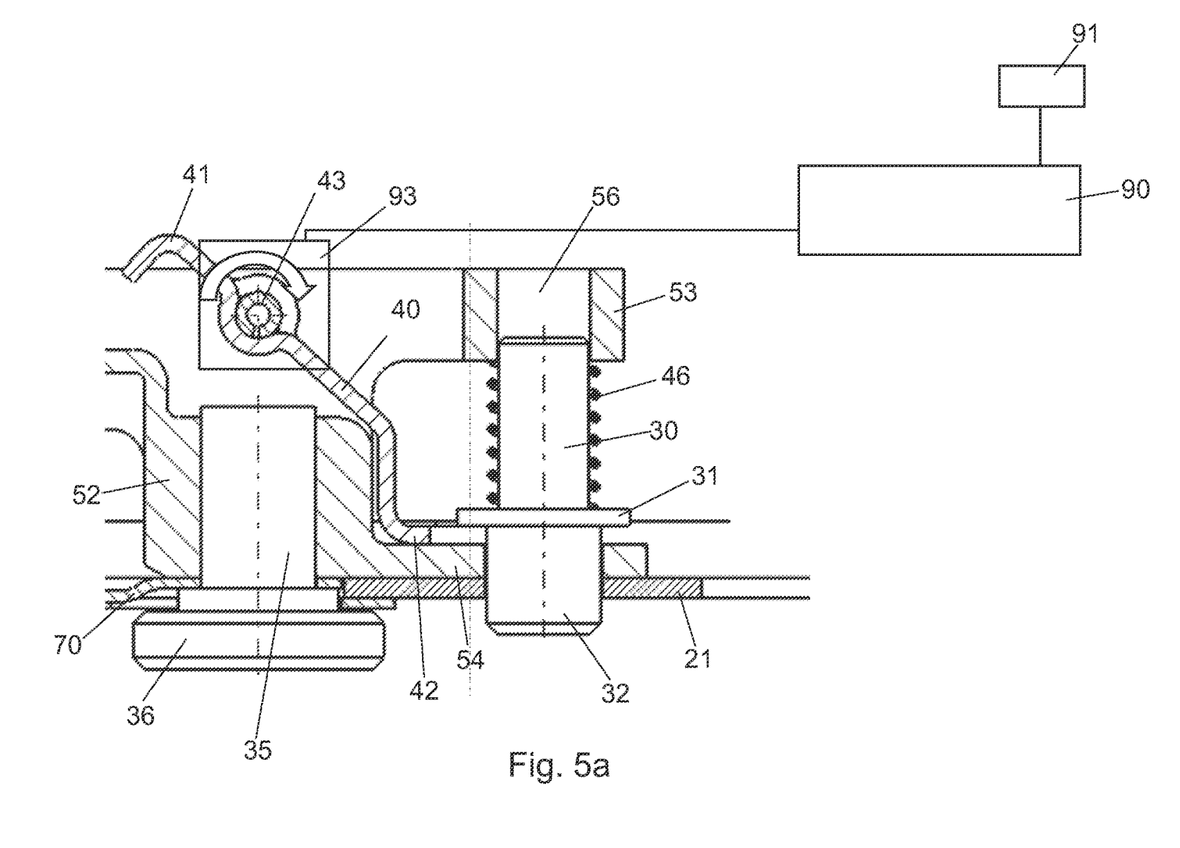
FIGS. 5a and 5b show additional embodiments with an actuator for automatically unlocking the fastening members.

In the exemplary embodiment according to FIG. 5a, for unlocking the locking bolt 30, an electric motor 93 is coupled to the pivot axis 43 and the actuating lever 40 to pivot the lever 40 about the pivot axis 43 when activated.

Figure 5B:
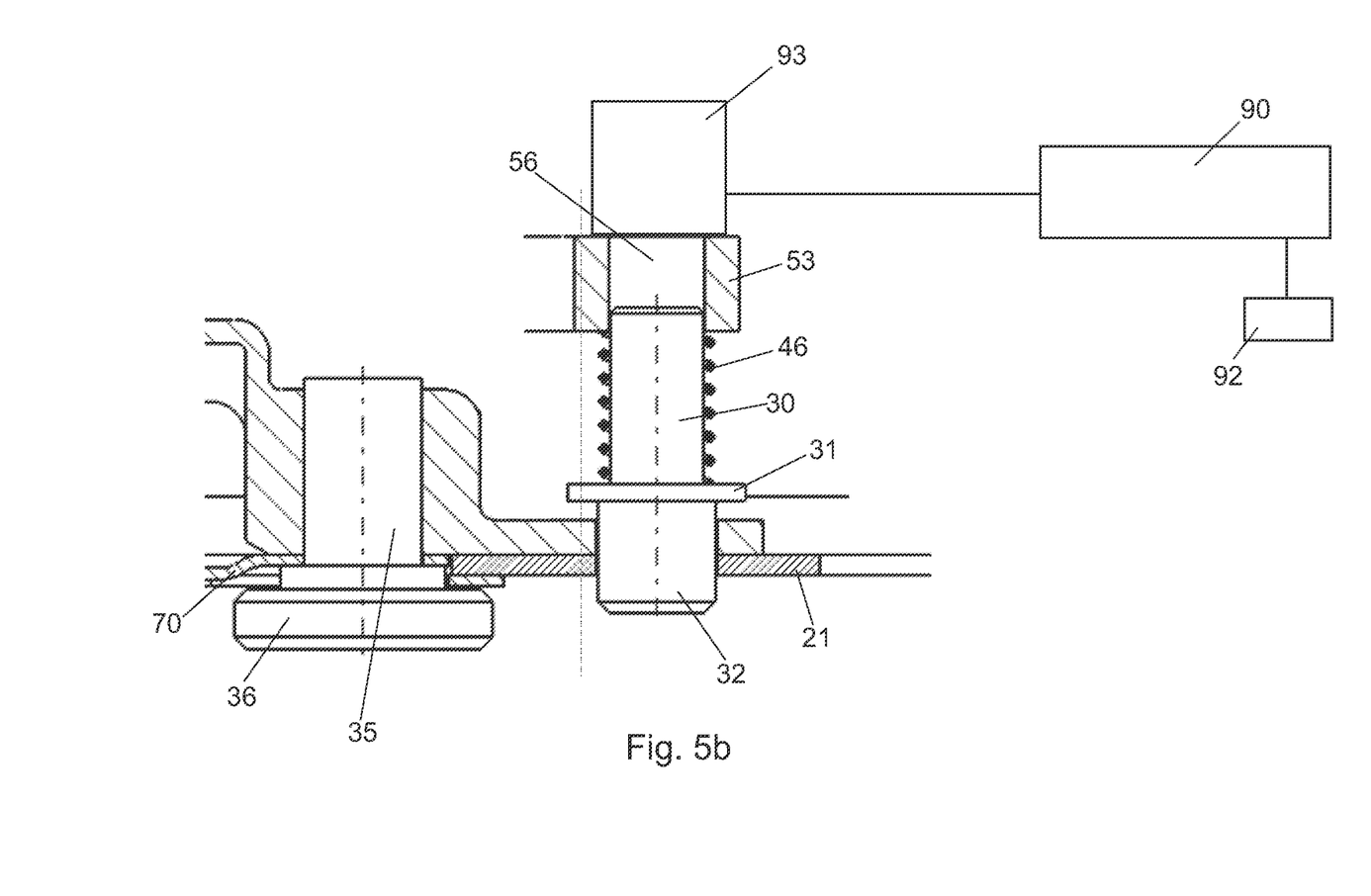

In the exemplary embodiment according to FIG. 5b, for unlocking the locking bolt 30, an actuator 93 is directly coupled to the locking bolt 30 to raise and unlock it when the actuator 93 is activated by the central control unit 90, as described above. The actuator 93 may be a linear actuator for this purpose, or may comprise a pyrotechnically ignitable solid propellant, which is known from airbags, for example.

As can be seen from FIGS. 3 to 5b, after the locking bolt 30 is raised, an upper end of the locking bolt 30 can slide into a hole 56 of the spindle mounting bracket 52, which allows the locking bolt 30 to be displaced exactly in vertical direction, and thus enables it to be locked again in a reliable manner when the actuator 93 is deactivated or when the actuating lever 40 is pivoted back.

In a normal state, i.e. in a locked state, the seat rail module and the vehicle seat are thus relatively rigidly coupled to the floor of a vehicle body. However, when the vehicle seat is displaced beyond a predetermined limit setting, an indirect coupling of the seat rail module and vehicle seat to the floor of a vehicle body is implemented by unlocking locking bolts, with an interposed deformation member specifically providing for the dissipation of energy in a situation involving sudden very high acceleration forces, in particular in the event of a front crash or rear crash.

Although it has been described above that the spindle of the spindle drive for longitudinal adjustment of the vehicle seat is attached to a lower rail of the seat rail module, this spindle of the spindle drive may of course also be attached in a corresponding manner to an upper rail of the rail module.

As will readily be apparent to the person skilled in the art upon studying the foregoing description, the crash bolts 35 can be further adapted and varied in number, material (shear strength) and diameter so that, with a standardized seat rail module, even different triggering thresholds can be 'set' depending on the vehicle. For this purpose, the crash bolts 35 can in particular be designed as shear members or can comprise shear members, as disclosed by way of example in DE 102014217506 A1 of the Applicant, the contents of which are hereby expressly incorporated by way of reference.

LIST OF REFERENCE SIGNS 1 vehicle seat (back rest upright)
1' vehicle seat (after displacement beyond limit setting)
2 floor of vehicle body
3 back rest
6 vehicle occupant
7 main direction of travel 8 limit line for longitudinal adjustment
9 limit line for inclination of back rest
10 rail for longitudinal adjustment
11 connecting lever
15 upper rail
16 control cam on upper rail 15
17 through hole
20 lower rail
21 bottom of lower rail 20
22 recess
23 recess
24 oblong hole
30 locking bolt
31 projection
32 engagement end of locking bolt 30
35 crash bolt
36 plate of crash bolt 35
40 actuating lever
41 first lever arm of actuating lever 40
42 second lever arm of actuating lever 40
43 rotation axis/pin
44 bearing for rotation axis 43
45 recess
46 compression spring
50 spindle
51 front spindle mounting bracket
52 rear spindle mounting bracket
53 connecting portion
54 fastening portion
55 clearance
56 hole
57 hole
58 receptacle
59 through hole
60 recess
70 deformation member
71 hole
80 gear
81 mounting bracket
90 central control unit
91 adjustment drive for longitudinal adjustment of vehicle seat
92 sensor
93 actuator
100 seat rail module

The invention claimed is:

1. A seat rail module for a vehicle seat, comprising:
two rails for longitudinal adjustment arranged parallel to one another for guidance and longitudinal adjustment of the vehicle seat, each rail for longitudinal adjustment having a lower rail, which can be fixedly fastened to a floor of a vehicle body, and an upper rail, which can be displaced longitudinally with respect to the lower rail,
a drive member having a drive coupled to the drive member, for longitudinal adjustment of the vehicle seat,
at least one deformation member coupled to an associated rail for longitudinal adjustment, and
at least one fastening member for fastening the drive member to the associated lower rail or upper rail, wherein
the upper rails are designed so that the vehicle seat can be fastened to the upper rails, and
the deformation member is designed to be deformed upon displacement of the vehicle seat in a main direction of travel to dissipate energy in the event of a crash and to decelerate the vehicle seat;
said seat rail module further comprising an actuator for locking and unlocking the at least one fastening member, wherein
in a locked position of the fastening member, the drive member is secured by the fastening member directly to the associated lower rail or upper rail, and
the fastening member is mechanically unlocked upon displacement of the vehicle seat beyond a predetermined limit setting, so that the drive member is coupled to the associated lower rail or upper rail via the deformation member.

2. The seat rail module as claimed in claim 1, wherein the drive member is coupled to an associated lower rail or upper rail and secured to the associated lower rail or upper rail by means of mounting brackets.

3. The seat rail module as claimed in claim 2, wherein a first mounting bracket of the mounting brackets has a recess at a first end of the associated lower rail or upper rail and the fastening member engages in the recess in the locked position.

4. The seat rail module as claimed in claim 3, wherein a second mounting bracket of the mounting brackets is rigidly attached to the associated lower rail or upper rail at a second end of the associated lower rail or upper rail.

5. The seat rail module as claimed in claim 3, wherein the actuator is configured as a lever that is pivotally mounted on the first mounting bracket, wherein the fastening member is formed as a locking bolt having a circumferential plate-like projection and wherein the lever has a lever arm with a recess which engages behind the circumferential plate-like projection of the associated locking bolt in order to unlock the latter by raising when the lever is displaced.

6. The seat rail module as claimed in claim 5, wherein the lever is accommodated in a receptacle formed in the first mounting bracket.

7. The seat rail module as claimed in claim 1, further comprising a securing member for securing the deformation member to the associated lower rail or upper rail, wherein the securing member is movable relative to the associated lower rail or upper rail in the longitudinal direction thereof in the event of a crash to compensate for a change in length of the deformation member.

8. The seat rail module as claimed in claim 7, wherein an oblong hole is formed in a bottom of the associated lower rail or upper rail and the securing member engages through the oblong hole.

9. The seat rail module as claimed in claim 1, wherein the predetermined limit setting corresponds to a predetermined longitudinal position of the upper rails relative to the associated lower rails and wherein the fastening member is mechanically unlocked upon a longitudinal displacement of the vehicle seat in a direction opposite to the main direction of travel beyond the predetermined longitudinal position.

10. The seat rail module as claimed in claim 9, wherein the rails for longitudinal adjustment accommodate push-down members which are coupled to the vehicle seat, wherein the push-down members actuate the actuator for unlocking the fastening member upon a longitudinal displacement of the vehicle seat in the direction opposite to the main direction of travel beyond the predetermined longitudinal position.

11. The seat rail module as claimed in claim 10, wherein the push-down members are entrained during a longitudinal displacement of the vehicle seat.

12. The seat rail module as claimed in claim 10, wherein the push-down members are formed as portions of devices for longitudinal adjustment that can be actuated electrically and are accommodated in the rails for longitudinal adjustment, or wherein the push-down members are attached to or formed on the upper rails.

13. The seat rail module as claimed in claim 10, wherein, viewed in the longitudinal direction of the rails for longitudinal adjustment, front and/or rear edges of the push-down members are beveled.

14. The seat rail module as claimed in claim 9, wherein the predetermined longitudinal position of the upper rails relative to the associated lower rails, viewed in the longitudinal direction of the rails for longitudinal adjustment, is predetermined by an area in a vehicle where the vehicle seat is located outside an effective range of a front airbag.

15. The seat rail module as claimed in claim 1, wherein the predetermined limit setting corresponds to a predetermined setting of parameters of the vehicle seat, in particular a predetermined angle of inclination of a back rest of the vehicle seat, and wherein the fastening member is mechanically unlocked upon a displacement of the vehicle seat beyond the predetermined setting of parameters of the vehicle seat.

16. The seat rail module as claimed in claim 1, wherein the actuator comprises an electric motor, a linear actuator, or a pyrotechnically ignitable solid propellant coupled to the at least one fastening member.

17. The seat rail module as claimed in claim 1, further comprising an electronic control unit, wherein the electronic control unit is configured to activate the actuator upon displacement of the vehicle seat beyond the predetermined limit setting to unlock the at least one fastening member.

18. The seat rail module as claimed in claim 17, further comprising at least one sensor to monitor settings of the vehicle seat, wherein the sensor is coupled to the electronic control unit and the electronic control unit is configured to evaluate output signals of the sensor and to output an activation signal for activating the actuator.

19. The seat rail module as claimed in claim 1, wherein the respective deformation member is configured as a reversibly elastically deformable member.

20. The seat rail module as claimed in claim 1, wherein the respective deformation member is configured as an irreversibly plastically deformable member.

21. The seat rail module as claimed in claim 20, wherein the irreversibly plastically deformable member is formed as a compression rod or tension rod.

22. The seat rail module as claimed in claim 1, wherein the vehicle seat is a motor vehicle seat.

* * * * *